Matthew J. Campanella,
INVENTOR.
BY Harry M. Saragovitz
Edward J. Kelly
Herbert Berl
Aubrey J. Dunn Matthew J. Campanella,
INVENTOR.
BY Harry M. Saragovitz
Edward J. Kelly
Herbert Berl
Aubrey J. Dunn 3,453,447
SELF-SYNCHRONIZING TUNNEL DIODE AND CIRCUIT Matthew J. Campanella, Cherry Hill, N.J., assignor, by mesne assignments, to the United States of America as represented by the Secretary of the Army Filed Mar. 22, 1966, Ser. No. 538,165
Int. Cl. H03k 19/08, 19/10
U.S. Cl. 307—206 7 Claims

ABSTRACT OF THE DISCLOSURE

Two pairs of tunnel diodes are used, with the cathode of one diode of each pair connected, at respective terminals, to the anode of the other diode of the pair. Bias and clock potentials are applied across one pair of diodes, with the other pair of diodes connected across one of the diodes of the one pair. Signal input-output terminals are connected to the respective terminals.

An object of this invention is to provide a high speed self-synchronizing AND circuit using tunnel diodes.

The principles, construction, and operation of the circuit of the invention as well as the objects and advantages of the circuit of the present invention will be fully understood from the following description taken in connection with the accompanying drawings, in which.

Figure 1:
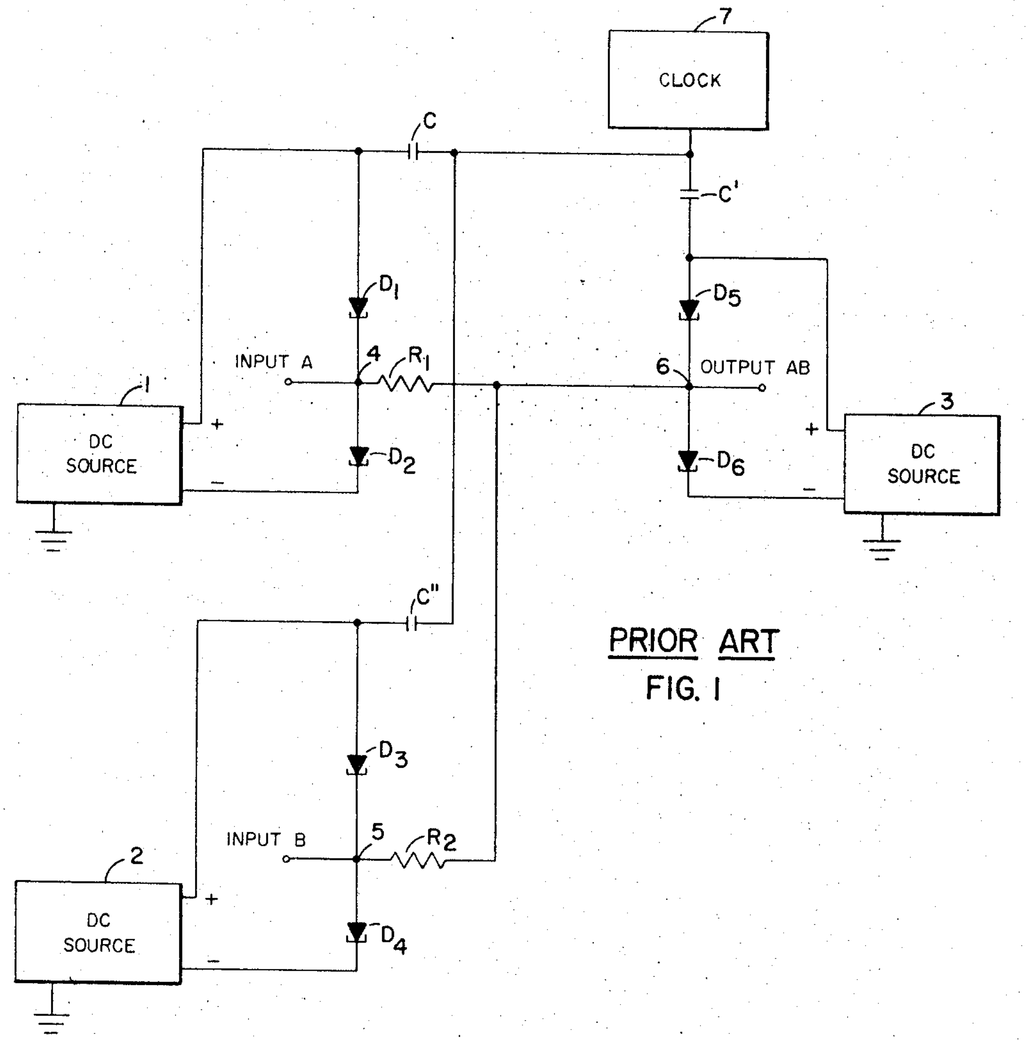
PRIOR ART FIG. 1
FIGURE 1 shows a prior art tunnel diode AND circuit.

Referring to FIGURE 1, there are shown six tunnel diodes $D_1$–$D_6$, divided into three pairs. In each pair, such as $D_1$–$D_2$, the cathode of one diode is connected to the anode of the other diode. Connected to other ends of the diodes of each pair is a D.C. voltage source respectively numered 1, 2 and 3. The level and polarity of voltage is such that one of the diodes in each pair is in its high voltage state and the other diode is in its low voltage state. Normally $D_1$, $D_3$ and $D_5$ are in the high voltage state, with the polarities indicated.

Inputs A and B are connected to terminals 4 and 5 respectively, and terminal 6 provides the output terminal for AB. When positive voltage is applied to either terminal 4 or 5, respectively diodes $D_1$ and $D_3$ go from their high voltage to their low voltage states and diodes $D_2$ and $D_4$ respectively go to their high voltage state. Resistors $R_1$ and $R_2$ are chosen so that when $D_2$ and $D_4$ are both in the high voltage state sufficient current is injetced into the midpoint of the pair $D_5$–$D_6$ to make $D_6$ go to its high voltage state. A detailed description of the operation of the pairs of tunnel diodes connected as shown may be found in United States Patent Nos. 3,138,-723 and 3,075,087. The peak current of $D_5$ is slightly less than that of $D_6$ so that $D_6$ normally recycles to its low voltage state unless both $D_2$ and $D_4$ are both in their high voltage state. The circuit may be synchronized by pulses from a clock source 7 through capacitors C, C′, and C″.

Figure 2:
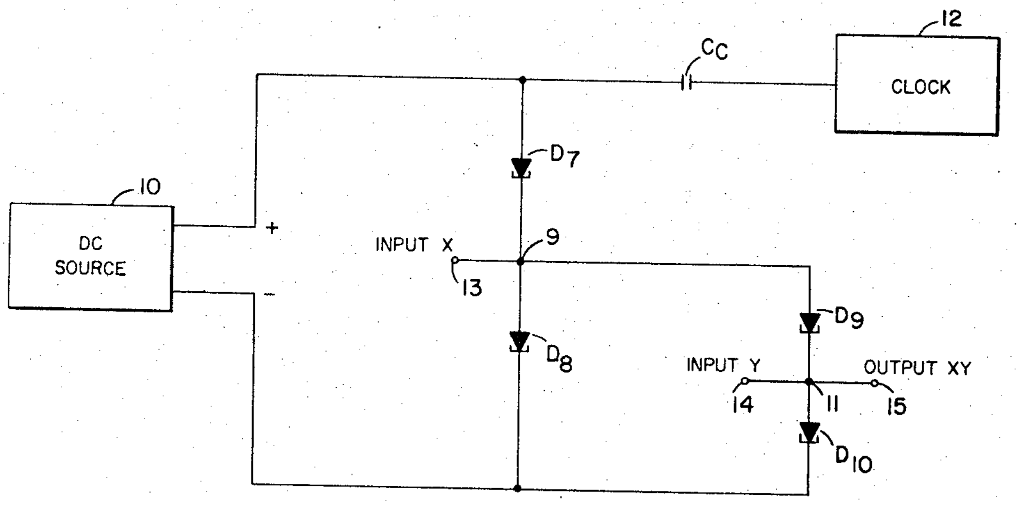
FIGURE 2 shows the circuit of the invention.

Referring now to FIGURE 2, a pair of diodes $D_7$ and $D_8$ are shown with a cathode to anode connection at point 9. A D.C. voltage source 10 is connected to the diodes with the polarities as shown. A second pair of diodes $D_9$ and $D_{10}$ are also connected in a cathode to anode relationship at point 11. Point 9 is connected to the anode of diode $D_9$ and the cathode of $D_8$ is connected to the cathode of $D_{10}$ and to the negative pole of D.C. source 10. The anode of $D_7$ is connected to the positive pole of D.C. source 10 and, by way of a coupling capacitor $C_c$, to clock pulse source 12. Terminals 13 and 14 serve as input terminals for two inputs X and Y and terminal 15 serves as the output terminal for XY. Diodes $D_7$ and $D_8$ are selected with peak currents so that $D_7$ normally goes to its high voltage state in the absence of an input voltage at point 13. Likewise, diodes $D_9$ and $D_{10}$ are selected with peak currents so that $D_9$ will assume its high voltage state in the absence of an input voltage at point 14, when the voltage at point 9 is high. Diodes $D_8$ and $D_{10}$ will be in their low voltage states when diodes $D_7$ and $D_9$ are in their high voltage states.

The operation of the FIGURE 2 circuit is as follows: the application of a clock pulse from the clock source, together with the voltage from the source 10 will cause diode D7 to assume its high voltage state, and $D_8$ to assume its low voltage state as explained above. The application of a positive input signal voltage X at point 13 will cause $D_7$ to change from its high voltage to its low voltage state, and conversely for $D_8$. The voltage at point 9 then assumes high value, diode $D_9$ assumes its high voltage state and diode $D_{10}$ assumes its low voltage state. The application of a positive input signal voltage Y at point 14 will cause diode $D_9$ to change from its high voltage state to its low voltage state, and conversely for $D_{10}$. The voltage at point 15 will then rise.

It can thus be seen that when two input signals (X and Y) are simultaneously applied to the FIGURE 2 circuit, an output XY will be obtained at point 15. The notation XY is taken as representing the Boolian AND relationship, and not the normal algebraic meaning.

While a specific embodiment of the invention has been described, other embodiments may be obvious to one skilled in the art, in view of the present disclosure.

I claim:

1. An AND circuit including first, second, third and fourth tunnel diodes, the cathode of said first diode connected at a first terminal to the anode of said second diode, D.C. voltage means coupled to the anode of said first diode and the cathode of said second diode providing voltage at a level sufficient for one of said first and second diodes to assume its high voltage state and the other of said first and second diodes to assume its low voltage state, the cathode of said third diode connected at a second terminal to the anode of said fourth diode, the anode of said third diode connected to the cathode of said first diode, the cathode of said fourth diode connected to the cathode of said second diode, and signal input-output terminals connected to said first and second terminals.

2. The circuit of claim 1 further including clock means connected to the anode of said first diode.

3. The circuit of claim 1 wherein the voltage at said first terminal is at a relatively low value in the absence of an input signal voltage thereto.

4. The circuit of claim 1 wherein the application of an input signal voltage to said first terminal causes the one of first and second diodes which is in its high voltage state to assume its low voltage state, and the other of said first and second diodes to change from its low voltage state to its high voltage state.

5. The circuit of claim 4 wherein one of said third and fourth diodes assumes its high voltage state, and the other of said third and fourth diodes assumes its low voltage state, upon a change in state of said first and second diodes.

6. The circuit of claim 5 wherein an input signal voltage applied to said second terminal causes the one of said third and fourth diodes which is in its high voltage state to assume its low voltage state, and the other of said third and fourth diodes to change from its low voltage state to its high voltage state.

7. The circuit of claim 1, wherein the voltage at said second terminal changes from a relatively low value to a relatively high value upon simultaneous application of input signal voltages to said first and second terminals.

References Cited

UNITED STATES PATENTS

| | | | |
|---|---|---|---|
| 3,166,682 | 1/1965 | Parham | 307—206 |
| 3,207,920 | 9/1965 | Galletti | 307—206 |
| 3,209,163 | 9/1965 | Wendt | 307—206 |

DONALD D. FORRER, *Primary Examiner.*

U.S. Cl. X.R.

307—208, 218